(12) United States Patent
Ohshima

(10) Patent No.: US 10,979,592 B2
(45) Date of Patent: Apr. 13, 2021

(54) ELECTRONIC DEVICE COMMUNICATING WIRELESSLY WITH EXTERNAL DEVICE SELECTIVELY USING ONE OF A PLURALITY OF WIRELESS COMMUNICATION INTERFACES, AND METHOD OF CONTROLLING SAME

(71) Applicant: CANON KABUSHIKI KAISHA, Tokyo (JP)

(72) Inventor: Hideaki Ohshima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 16/266,223

(22) Filed: Feb. 4, 2019

(65) Prior Publication Data

US 2019/0246035 A1 Aug. 8, 2019

(30) Foreign Application Priority Data

Feb. 7, 2018 (JP) .............................. JP2018-020334

(51) Int. Cl.
*H04N 5/232* (2006.01)
*H04N 1/32* (2006.01)

(52) U.S. Cl.
CPC . *H04N 1/32106* (2013.01); *H04N 2201/0084* (2013.01)

(58) Field of Classification Search
CPC combination set(s) only.
See application file for complete search history.

(56) References Cited

U.S. PATENT DOCUMENTS

| 7,180,996 B2 * | 2/2007 | Ishikawa | H01Q 1/2275 379/357.01 |
| 2014/0184824 A1 * | 7/2014 | Matsuda | H04N 1/00095 348/207.1 |

FOREIGN PATENT DOCUMENTS

JP 2013-187713 A 9/2013

* cited by examiner

*Primary Examiner* — Gary C Vieaux
(74) *Attorney, Agent, or Firm* — Cowan, Liebowitz & Latman, P.C.

(57) ABSTRACT

An electronic device that is capable of using a plurality of wireless communication units and communicates wirelessly with an external device using one of the plurality of wireless communication units, is disclosed. The device comprises a storage device that stores one or more sets of settings used in past wireless communication with one or more external device, the settings being stored separately as settings pertaining to a network used in the wireless communication and settings pertaining to communication with an external device over the network. The device also extracts a set of settings that can be used from the one or more sets of settings stored in the storage device, in accordance with a combination of a type of an external device with which wireless communication to be performed and a wireless communication unit to be used for the wireless communication.

11 Claims, 7 Drawing Sheets

FIG. 2

| CONNECTED DEVICE INFORMATION NUMBER | 1 | 2 | 3 | 4 | 5 | ... | N |
|---|---|---|---|---|---|---|---|
| CONNECTED ORDER | 1 | 2 | 3 | 4 | 5 | . | . |
| DEVICE TYPE | MOBILE PHONE | MOBILE PHONE | PC | FTP | PC | . | . |
| REGISTRATION NAME | mobile Phone1 | mobile Phone2 | PC1 | FTP1 | PC2 | . | . |
| UUID | 0000-ABCD-EFGH | 0000-1234-5678 | 0011-AAAA-8888 | - | 0011-BBBB-9999 | . | . |
| BROWSING PERMISSION | PERMIT | PROHIBIT | PERMIT | - | PERMIT | . | . |
| FTP SERVER ADDRESS | - | - | - | 192.168.1.2 | - | . | . |
| FTP LOGIN NAME | - | - | - | anonymous | - | . | . |
| FTP PASSWORD | - | - | - | 0 | - | . | . |
| FILE OVERWRITE | - | - | - | OVERWRITE | - | . | . |
| NETWORK FORMATION PARAMETER NUMBER | 1 | - | - | - | 2 | . | . |

| JOINED NETWORK PARAMETER NUMBER | 1 | 2 | 3 | 4 | 5 | ... | M |
|---|---|---|---|---|---|---|---|
| JOINED ORDER | 1 | 2 | 3 | . | . | . | . |
| ESSID | NETWORK-100 | NETWORK-101 | NETWORK-102 | . | . | . | . |
| AUTHENTICATION METHOD | WPA2 | WPA2 | WPA2 | . | . | . | . |
| ENCRYPTION TYPE | AES | AES | AES | . | . | . | . |
| ENCRYPTION KEY | abcdefgh | 12345678 | networkkey | . | . | . | . |
| CHANNEL | 1 | 36 | 6 | . | . | . | . |
| IP ADDRESS ACQUISITION METHOD | Auto | Auto | Auto | . | . | . | . |
| DNS ACQUISITION METHOD | Auto | Auto | Auto | . | . | . | . |

| NETWORK FORMATION PARAMETER NUMBER | 1 | 2 | 3 | 4 | 5 | ... | M |
|---|---|---|---|---|---|---|---|
| ESSID | CAMERA-123 | CAMERA-345 | . | . | . | . | . |
| ENCRYPTION KEY | 12345678 | 87654321 | . | . | . | . | . |

FIG. 7A

|  | FTP | PC | SMARTPHONE |
|---|---|---|---|
| EXTERNAL WiFi | ○ | ○ | × |
| WIRED LAN | ○ | ○ | ○ |
| BUILT-IN WiFi | × | ○ | ○ |

FIG. 7B

|  | 2.4GHz BAND | 5GHz BAND |
|---|---|---|
| EXTERNAL WiFi | ○ | ○ |
| BUILT-IN WiFi | ○ | × |

FIG. 7C

|  | FTP | PC | SMARTPHONE |
|---|---|---|---|
| EXTERNAL WiFi | ○ | ○ | × |
| BUILT-IN WiFi | × | ○ | ○ |

ELECTRONIC DEVICE COMMUNICATING WIRELESSLY WITH EXTERNAL DEVICE SELECTIVELY USING ONE OF A PLURALITY OF WIRELESS COMMUNICATION INTERFACES, AND METHOD OF CONTROLLING SAME

BACKGROUND OF THE INVENTION

Field of the Invention

The present invention relates to an electronic device and method of controlling the same, and particularly relates to techniques for managing communication settings.

Description of the Related Art

Recently, external wireless adapters (wireless transmitters) are sometimes used in electronic devices having built-in wireless communication functions, in order to realize higher-speed wireless communication, for example. Techniques for assisting with the wireless adapter communication settings by using details of the settings for the built-in wireless communication function in such cases are known (Japanese Patent Laid-Open No. 2013-187713 (PTL 1)). In PTL 1, the communication settings are simplified by writing communication settings, which are stored for the built-in wireless communication function, into a recording medium having a wireless communication function.

However, if the capabilities of a built-in wireless communication interface and an external wireless communication interface are different, there are situations where the communication settings cannot be shared. In this case, the technique disclosed in PTL 1 cannot be used.

Settings pertaining to network connections differ depending on the wireless interface, but there are situations where the same settings are sufficient for communication carried out over a network with which a connection is established (e.g., communication between applications). However, the technique disclosed in PTL 1 makes no mention regarding settings pertaining to communication carried out over a network. If settings pertaining to network connections and settings pertaining to communication over the network are managed for each wireless interface, settings that can be shared must also be re-set for each wireless interface.

SUMMARY OF THE INVENTION

The present invention has been conceived in order to solve these problems with past techniques. The present invention makes it possible to more efficiently use stored settings information in an electronic device capable of using a plurality of communication methods.

According to an aspect of the present invention, there is provided an electronic device capable of using a plurality of wireless communication units, the electronic device communicating wirelessly with an external device using one of the plurality of wireless communication units, the electronic device comprising: a storage device that stores one or more sets of settings used in past wireless communication with one or more external device, the settings being stored separately as settings pertaining to a network used in the wireless communication and settings pertaining to communication with an external device over the network; and a control unit that extracts a set of settings that can be used from the one or more sets of settings stored in the storage device, in accordance with a combination of a type of an external device with which wireless communication to be performed and a wireless communication unit to be used for the wireless communication.

According to another aspect of the present invention, there is provided a method of controlling an electronic device capable of using a plurality of wireless communication units, the electronic device communicating wirelessly with an external device using one of the plurality of wireless communication units, wherein the electronic device includes a storage device that stores one or more sets of settings used in past wireless communication with one or more external device, the settings being stored separately as settings pertaining to a network used in the wireless communication and settings pertaining to the communication with an external device over the network; and the method comprising: extracting a set of settings that can be used from the one or more sets of settings stored in the storage means, in accordance with a combination of a type of an external device with which wireless communication to be performed and a wireless communication unit to be used for the wireless communication.

According to a further aspect of the present invention, there is provided a non-transitory computer-readable medium storing a program for causing a computer of an electronic device capable of using a plurality of wireless communication units, wherein the electronic device communicates wirelessly with an external device using one of the plurality of wireless communication units and comprises a storage device that stores one or more sets of settings used in past wireless communication with one or more external device, the settings being stored separately as settings pertaining to a network used in the wireless communication and settings pertaining to communication with an external device over the network, and wherein the program causes, when executed by the computer, the computer to function as a control unit that extracts a set of settings that can be used from the one or more sets of settings stored in the storage device, in accordance with a combination of a type of an external device with which wireless communication to be performed and a wireless communication unit to be used for the wireless communication.

Further features of the present invention will become apparent from the following description of exemplary embodiments with reference to the attached drawings.

BRIEF DESCRIPTION OF THE DRAWINGS

FIG. 2 is a diagram illustrating an example of settings information stored by the digital camera according to the embodiment.

FIGS. 7A to 7C are diagrams illustrating an example of a correspondence relationship between communication methods and functions of the digital camera according to an embodiment.

DESCRIPTION OF THE EMBODIMENTS

Exemplary embodiments of the present invention will now be described in detail in accordance with the accompanying drawings. The following describes embodiments in which the present invention is applied in a digital camera serving as an example of an electronic device that can use a plurality of communication methods. However, the present invention can be applied in any desired electronic device that can use a plurality of communication methods. The electronic device includes a personal computer, a printer (including a multi-function peripheral), a photocopier, a game console, a mobile phone (including a smartphone), a media player, a home appliance, a robot, a drone, and the like, but is not limited thereto. The embodiments described below can be changed as appropriate in accordance with the configuration of the device in which the present invention is applied, various types of conditions, and so on. Some or all of multiple embodiments can be combined as well.

First Embodiment

Figure 1:
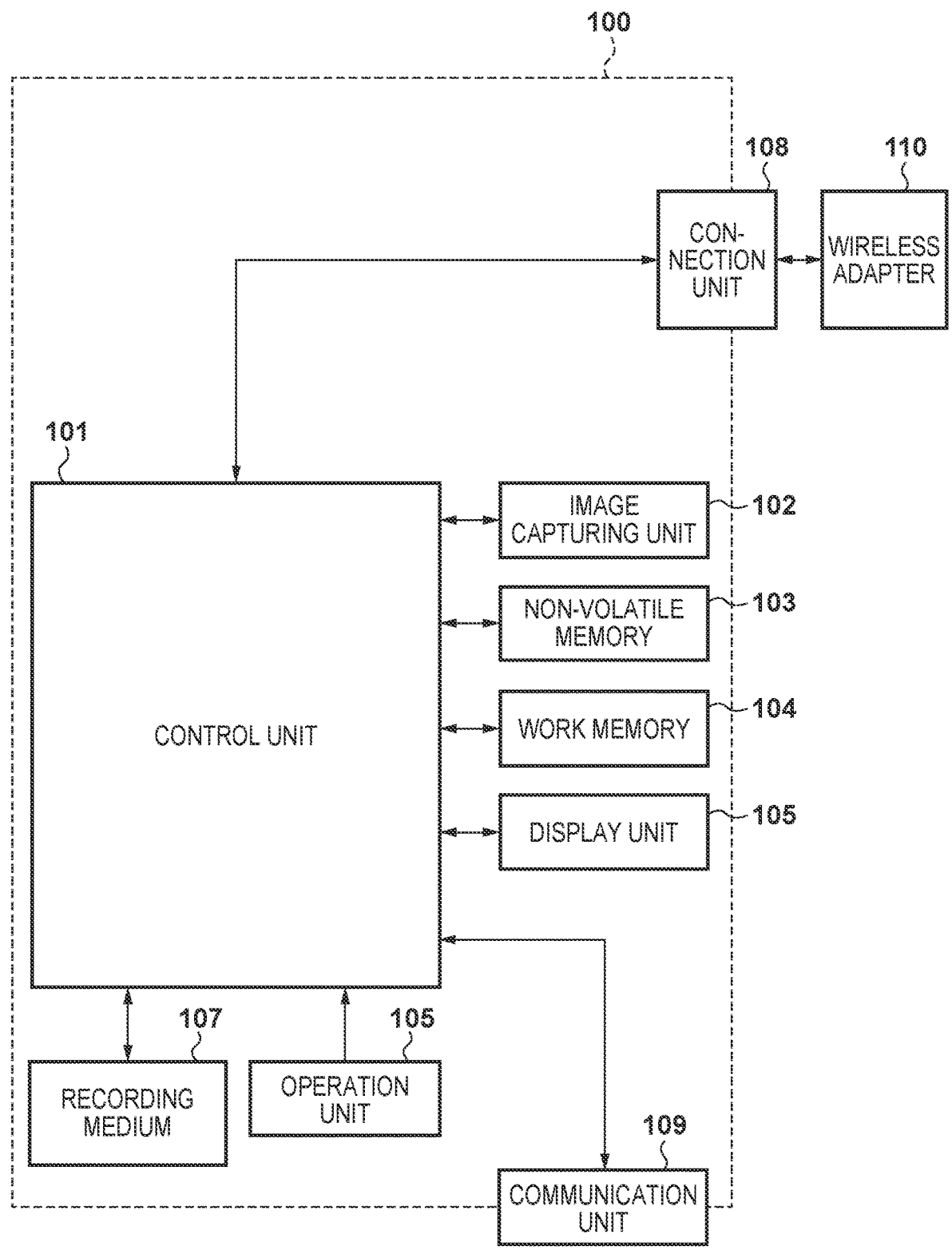
FIG. 1 is a block diagram illustrating an example of the functional configuration of a digital camera serving as an example of an electronic device according to an embodiment of the present invention.

FIG. 1 is a block diagram illustrating an example of the functional configuration of a digital camera 100 according to an embodiment of the present invention. A control unit 101 includes one or more programmable processors (CPUs, MPUs, or the like). The control unit 101 controls the various units of the digital camera 100 and realizes the functions of the digital camera 100 by loading programs stored in non-volatile memory 103, for example, into work memory and executing the programs using the programmable processor. Note that if the control unit 101 includes a plurality of microprocessors, the processing may be divided among the individual microprocessors. Additionally, some operations realized by the control unit 101 executing programs may be performed by dedicated hardware (a DSP, ASIC, ASSP, FPGA, or the like). The control unit 101 also functions as control means for providing various types of GUIs to a user by displaying the GUIs in a display unit 106.

An image capturing unit 102 includes an optical imaging system, an image sensor, and peripheral circuitry thereof. The image capturing unit 102 captures an image in response to an instruction from the control unit 101, and reads out an image signal from the image sensor. The image capturing unit 102 generates image data by subjecting the image signal to noise reduction processing, A/D conversion, and the like, and supplies the image data to the control unit 101.

After storing the image data in work memory 104, the control unit 101 subjects the image data to predetermined image processing such as white balance adjustment, color interpolation processing, encoding processing, and so on. The control unit 101 generates image data subjected to image processing based on where the image data will be recorded, displayed, or the like, and displays the image data in the display unit 106, records the image data in a recording medium 107, or the like. The control unit 101 also generates evaluation values for automatic exposure control (AE), automatic focus detection (AF), or the like from the image data, and sets a focal distance, exposure conditions, and so on of the image capturing unit 102 on the basis of the evaluation values. The control unit 101 can also carry out an object region (e.g., a facial region) detection process on the image data, and can perform operations using the object region (e.g., an object tracking process, AE and AF based on the object region, and the like).

The non-volatile memory 103 can be electrically erased and recorded to, and stores programs executed by the control unit 101, GUI data such as menu screens and icons, various types of setting values, and the like.

The work memory 104 is used as buffer memory for temporarily storing the image data generated by the image capturing unit 102, video memory for the display unit 106, a work area for the control unit 101, and the like.

"Operation unit 105" is a collective name for an input device group operated by the user, including switches, buttons, a touch panel, dials, and the like. The user can use the operation unit 105 to set image capturing conditions, operate menu screens, and the like. Operations of the operation unit 105 are detected by the control unit 101, and the control unit 101 executes processing based on the detected operations.

The operation unit 105 includes, for example, a power button for instructing the digital camera 100 to turn on and off, a release switch for instructing preparations for and the start of image capture, a playback button for instructing the playback of image data, and so on. If the display unit 106 (described later) is a touch display, a touch panel included in the display unit 106 is also part of the operation unit 105. Note that the release switch includes a switch that turns on when depressed halfway (SW1) and a switch that turns on when fully depressed (SW2). The control unit 101 recognizes the SW1 being on as an image capture preparation instruction, and starts predetermined image capture preparation operations such as AF and AE. The control unit 101 recognizes the SW2 being on as an image capture start instruction, and executes image capture operations for the purpose of recording and a series of processes for recording the captured image data. Note that image capture operations for displaying a live view image in the display unit 106, for example, correspond to image capture operations not for the purpose of recording.

The display unit 106 is a liquid crystal or organic EL display, for example, and displays a live view image, GUI elements such as menu screens and icons, images based on image data read out from the recording medium 107, and so on under the control of the control unit 101. Note that the display unit 106 may be an external device. The control unit 101 includes a display control function for the display unit 106, which is built-in and/or external.

The recording medium 107 is a non-volatile storage device, for example, and the control unit 101 can read and write data from and to the recording medium 107. The recording medium 107 may be removable from the digital camera 100, as with a memory card or the like, or may be built into the digital camera 100. The recording medium 107 may be an external device.

A connection unit 108 is an external interface of the digital camera 100. In the present embodiment, a wireless adapter 110 is configured to be attachable to and removable from the connection unit 108. The connection unit 108 may be a generic interface such as USB, or may be a dedicated interface for accessories such as the wireless adapter 110. The wireless adapter 110 may have an interface that supports a wireless communication standard such as Ethernet (registered trademark). The operations of the wireless adapter 110 attached to the connection unit 108 can be controlled by the control unit 101 loading a program, which is stored in the non-volatile memory 103, into the work memory 104 and executing the program.

The digital camera 100 further includes a communication unit 109. The communication unit 109 is capable of wireless and/or wired communication, for example. Typically, the wireless adapter 110, which is a dedicated communication device, handles higher communication speeds than the communication unit 109. Here, it is assumed that both the wireless adapter 110 and the communication unit 109 are wireless communication interfaces that is compliant with a wireless LAN standard (the IEEE 802.11 series). Note that the wireless adapter 110 and the communication unit 109 can be compliant with a plurality of communication protocols. The wireless adapter 110 and the communication unit 109 may be compliant with different communication protocols as well.

Note that in the present embodiment, the digital camera 100 can operate as a slave device in wireless LAN infrastructure mode. In this case, by connecting to a nearby access point (AP), the digital camera 100 can join a network formed by that AP. Note that the digital camera 100 can also function as a simplified AP with limited functions (a simple AP). Accordingly, devices within a communication range of the digital camera 100 can recognize the digital camera 100 as an AP and join a network formed by the digital camera 100. Note that the simple AP does not have a gateway function for transferring data received from a slave device to an internet service provider or the like. Accordingly, when operating as a simple AP, the digital camera 100 cannot transfer data received from other devices, which are on the network formed by the digital camera 100, to other networks. However, the digital camera 100 can be given gateway functionality. By loading programs, which are stored in the non-volatile memory 103, into the work memory 104 and executing the programs, the control unit 101 can cause the digital camera 100 to function as a slave device in infrastructure mode or a simple AP. Whether the digital camera 100 operates as a slave device or a simple AP is assumed to be set in advance.

Next, history information held by the digital camera 100 according to the present embodiment will be described with reference to FIG. 2.

When the digital camera 100 communicates with an external device on the network ("partner device" hereinafter), the digital camera 100 first connects to the network and then establishes communication with the partner device connected to the network. The network connection may involve joining a network formed by the external device, or operating as a simple AP and forming its own network. The digital camera 100 according to the present embodiment manages information pertaining to networks connected to in the past and information pertaining to partner devices communicated with in the past as individual pieces of history information. FIG. 2 illustrates an example of the history information (also referred to as a set of settings) held by the digital camera 100. Here, connected device information 210 is information pertaining to partner devices, and joined network parameters 220 and network formation parameters 230 are information pertaining to networks.

The connected device information 210 is information pertaining to partner devices with which the digital camera 100 has communicated over the network. Note that the connected device information 210 is an example of history information stored in the non-volatile memory 103, for example. "Connected device information number" is a unique number assigned to each piece of connected device information. "Connected order" indicates an order in which the partner devices stored in the connected device information 210 connected in the past, with higher numbers indicating more recent connections.

"Device type" is information indicating the type of the device. Here, "type" is information expressed in a way that is recognizable by a human, such as "mobile phone", "PC", or the like, but may be in another format, such as a numerical value. "Registration name" is a connected device name that can be set by the user. "UUID" is unique information randomly assigned to devices. Note that "device type", "registration name", and "UUID" do not actually have to be individual pieces of information, and for example, these pieces of information may be specified using a single character string in which the type, the name, and a unique character string are connected.

"FTP server address" is the address of an FTP server to which the digital camera 100 connects if the digital camera 100 has an FTP client mode. "FTP login name" and "FTP password" are a login name and password for logging into the FTP server to be connected to. "File overwrite" indicates whether or not to overwrite a file in the FTP server having the same name when transferring data files from the digital camera 100 to the FTP server. If the file is not to be overwritten, digital camera 100 changes the filename before the transfer, by adding "_1" to the end of the filename, for example. "Network formation parameter number" indicates which parameters were used to form the network, among the network formation parameters 230.

N (where N is a plural number) is assumed to be the upper limit for the number of pieces of connected device information 210 that can be stored. If, when N pieces of connected device information are already stored, a new piece of connected device information is to be stored, the information already stored is replaced with the new information. The user may be allowed to select the replaced (deleted) connected device information, or the information of the connected device having the lowest number for the "connected order" (i.e., the device that has not been connected for the longest period of time) may be automatically deleted.

The joined network parameters or settings 220 are information for managing wireless networks, formed by an external AP or the like, that the digital camera 100 has joined. "Joined order" indicates the order in which the wireless networks managed by the joined network parameters 220 were joined in the past, with higher numbers indicating more recent connections. For "ESSID", "authentication method", "encryption type", "encryption key", "channel", "IP address acquisition method", and "DNS acquisition method", corresponding information, values, or the like are stored.

M (where M is a plural number) is assumed to be the upper limit for the number of joined network parameters 220 that can be stored. If, when M joined network parameters are already stored, new joined network parameters are to be stored, the information already stored is replaced with the new information. The user may be allowed to select the replaced (deleted) joined network parameters, or the connection parameters of the network having the lowest number for the "joined order" (i.e., the network that has not been joined for the longest period of time) may be automatically deleted.

Note that the joined network parameters 220 are information for managing wireless networks formed by other devices. Networks formed by the digital camera 100 operating as a simple AP are managed by the network formation parameters or settings 230, which are separate from the joined network parameters 220.

A "network formation parameter number", "ESSID", and "encryption key", which added to individual network formation parameters, are stored in the network formation parameters 230. Like the joined network parameters 220, an authentication method, encryption type, channel, IP address acquisition method, DNS acquisition method, and the like may be stored for the network formation parameters 230 as well. However, items that are common for the wireless networks generated by the digital camera 100 need not be stored. The upper limit for the number of network formation parameters 230 that can be stored is the same as the connected device information 210 (N). If the connected device information 210 has been deleted, the control unit 101 also deletes the associated network formation parameters 230. This makes it unnecessary to manage the number of network formation parameters 230.

Next, operations through which the digital camera 100 according to the present embodiment makes communication settings with an external device using the history information will be described with reference to the flowchart in FIG. 3. Note that the operations of the digital camera 100, including the processes described hereinafter, are realized by the control unit 101 of the digital camera 100 loading programs, which are stored in the non-volatile memory 103, into the work memory 104 and executing the programs so as to control the various units in the digital camera 100.

Figure 3:
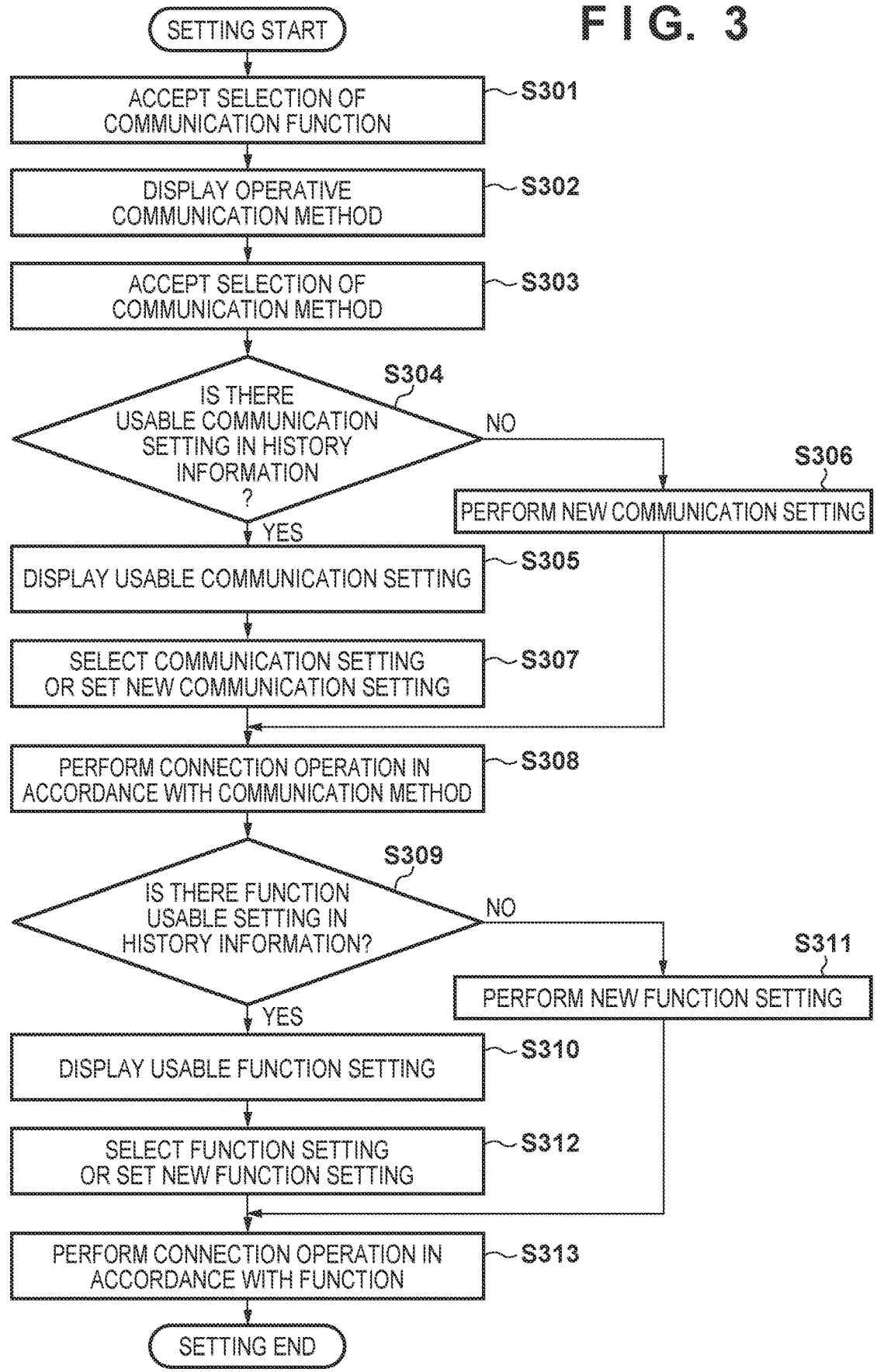
FIG. 3 is a flowchart pertaining to operations carried out by the digital camera according to a first embodiment.

The processing illustrated in FIG. 3 is started in response to the control unit 101 detecting that the user has called a communication settings screen by operating a menu or the like through the operation unit 105.

Note that here, it is assumed that the digital camera 100 stores the history information illustrated in FIG. 2 in the non-volatile memory 103. Additionally, it is assumed that the control unit 101 uses the history information read out from the non-volatile memory 103 into the work memory 104.

Figure 4:
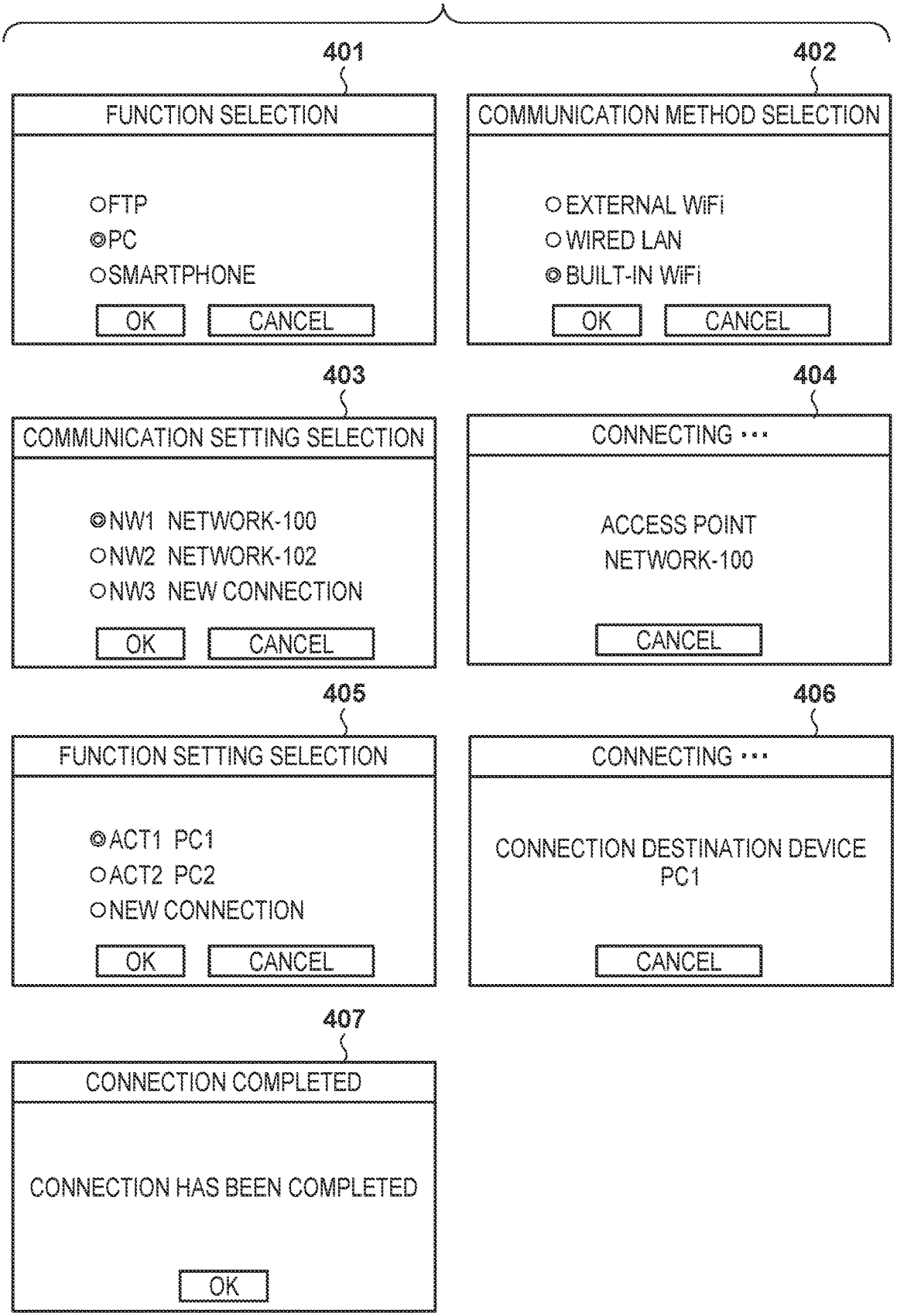
FIG. 4 is a diagram illustrating an example of a screen display in the digital camera according to the first embodiment.

In S301, the control unit 101 reads out screen data from the non-volatile memory 103 and writes that data into a video memory region of the work memory 104 to display a communication function selection screen 401, such as that illustrated in FIG. 4, in the display unit 106, and accepts the selection of a communication function. The communication function selection screen 401 is a screen for selecting the type of the partner device. With the digital camera 100 according to the present embodiment, "FTP" (FTP server), "PC", and "smartphone" can be selected, and it is assumed here that an OK button has been operated while "PC" is selected. Although not described individually below, the GUI displayed in the display unit 106 can be operated through the touch operations made on the display unit 106 (if the display unit 106 is a touch display), predetermined operations made to the operation unit 105, and so on. The operations of the GUI using the operation unit 105 may include moving a selection bracket using a directional key, operating an OK button by pressing a "set" button, operating a cancel button by pressing a "return" button, and the like, for example. The following descriptions assume that when a "cancel" button included in the screen display example is operated, the control unit 101 cancels the operations being executed and clears the screen.

In S302, the control unit 101 causes the display unit 106 to display a communication method selection screen 402 such as that illustrated in FIG. 4, which displays a list of communication methods supported by the connection unit 108 and the communication unit 109 (communication interfaces, communication protocols, and the like used by those units) in a selectable manner, and then moves the process to S303. The selectable communication methods may be set in advance for each communication function, for example, as illustrated in FIG. 7A (where the communication methods indicated by circles are selectable). However, if the supported communication methods differ depending on the type of the wireless adapter 110 that can be connected to the connection unit 108, the display of the selectable communication methods may be varied on the basis of the information of the connected wireless adapter 110. If the wireless adapter 110 is not connected, it is possible to not display the communication methods corresponding to the wireless adapter 110 or display those methods in a non-selectable manner. As illustrated in FIG. 7B, the present embodiment assumes that the communication unit 109 supports only communication in the 2.4 GHz band, and that the wireless adapter 110 attached to the connection unit 108 supports communication in both the 2.4 GHz and 5 GHz bands.

In the example illustrated in FIG. 4, the wireless adapter 110 is connected to the connection unit 108, and the selected communication function is "PC", and thus the communication methods displayed in the communication method selection screen 402 are "wireless adapter", "wired LAN", and "built-in Wi-Fi". Upon a communication method selection being accepted in S303, the control unit 101 moves the processing to S304. Here, it is assumed that "built-in Wi-Fi" was selected when the operation of the OK button was detected.

In S304, the control unit 101 determines whether or not there is information that can be used, on the basis of the communication method selected in S303 and the joined network parameters 220 in the history information. The control unit 101 moves the process to S305 if it is determined that there is information that can be used, and to S306 if it is determined that there is not information that can be used.

In S305, the control unit 101 extracts, from the joined network parameters 220, the information determined in S304 to be usable. The control unit 101 then displays network identification information (an ESSID, here) corresponding to the extracted information in a selectable manner in the display unit 106 through a communication settings selection screen 403, illustrated in FIG. 4, and stands by for the user to make a selection.

Here, "built-in Wi-Fi" is selected as the communication method, and thus communication is only possible in the 2.4 GHz band. Referring to the joined network parameters 220 of the history information illustrated in FIG. 2, the joined network parameters 222, among the joined network parameters 221 to 223, has a channel number of 36 (the 5 GHz band). Accordingly, the control unit 101 determines that the joined network parameters 222 cannot be used with the built-in Wi-Fi. On the other hand, the joined network parameters 221 and 223 have channel numbers of 1 and 6 (the 2.4 GHz band). Accordingly, the control unit 101 determines that the joined network parameters 221 and 223 are information that can be used, and causes the network identification information corresponding to the joined network parameters 221 and 223 to be displayed in the display unit 106 in a selectable manner. The control unit 101 also includes "new connection", for selecting a connection to a new network, as an option in the communication settings selection screen 403.

Upon accepting an operation for selecting a network through the communication settings selection screen 403 in S307, the control unit 101 determines that the joined network parameters corresponding to the selected network are to be used as the communication settings, and moves the process to S308. Here, it is assumed that "NETWORK-100" was selected when the operation of the OK button was detected, as illustrated in FIG. 4. Note that if "new connection" has been selected, the control unit 101 displays an input screen for the parameters required to join the network (the ESSID, authentication method, encryption type, encryption key, IP address acquisition method, and the like) in the display unit 106. Nearby APs may be scanned using the selected communication method (here, the communication unit 109) and presented to the user as well. Once an AP is selected, the control unit 101 causes an input screen for the parameters required to join the network formed by the selected AP to be displayed in the display unit 106. Once the required parameters have been input, the control unit 101 moves the process to S308.

If in S304 it is determined that there is no usable information in the history information, the control unit 101 carries out a new connection setting process in S306. Specifically, the same process as when "new connection" is selected in the communication settings selection screen 403 is carried out. Once the required parameters have been input, the control unit 101 moves the process to S308.

In S308, the control unit 101 carries out connection operations for the communication using the selected communication method (the external wireless adapter 110 connected to the connection unit 108 or the built-in communication unit 109), on the basis of the communication settings determined or input in S306 or S307. During performing the connection operations, the control unit 101 causes the display unit 106 to display a connection operation progress screen 404, illustrated in FIG. 4. If the connection operations end without a cancel instruction being accepted, the control unit 101 moves the process to S309.

In S309, the control unit 101 determines whether or not there is information that can be used, on the basis of the communication function selected in S301 and the connected device information 210 in the history information. The control unit 101 moves the process to S310 if it is determined that there is information that can be used, and to S311 if it is determined that there is not information that can be used.

In S310, the control unit 101 extracts, from the connected device information 210, the information determined in S309 to be usable. The control unit 101 then displays identification information (a registration name, here) corresponding to the extracted information in a selectable manner in the display unit 106 through a function settings selection screen 405, illustrated in FIG. 4, and stands by for the user to make a selection.

Here, "PC" is selected as the communication function. Referring to the connected device information 210 in the history information illustrated in FIG. 2, of the connected device information 211 to 215, the connected device information 213 and 215 have a device type of "PC". Accordingly, the control unit 101 determines that the connected device information 213 and 215 are usable information, and displays device identification information "PC1" and "PC2", corresponding to the connected device information 213 and 215, in the function settings selection screen 405, in a selectable manner. The control unit 101 also includes "new connection", for setting a new connected device, as an option in the function settings selection screen 405.

Upon accepting an operation for selecting a connected device through the function settings selection screen 405 in S312, the control unit 101 determines that the function settings corresponding to the selected connected device are to be used, and moves the process to S313. Here, it is assumed that "PC1" was selected when the operation of the OK button was detected, as illustrated in FIG. 4. If "new connection" has been selected, the control unit 101 causes a communication settings screen for setting information required for communication with the new connected device, such as identification information (UUID), in the display unit 106. If the identification information of the new connected device is acquired through a pairing operation, the control unit 101 causes a screen for executing the pairing operation to be displayed in the display unit 106. Note that the connection operations can be carried out without the pairing process if the device has been connected before.

If in S309 it is determined that there is no usable information in the history information, the control unit 101 carries out a new function setting process in S311. Specifically, the same process as when "new connection" is selected in the function settings selection screen 405 may be carried out. The control unit 101 then moves the process to S313.

In S313, the control unit 101 carries out connection operations (connection operations for communication between applications) with the connected device via the connection unit 108 or the communication unit 109, on the basis of the communication settings set in S311 or S312. The control unit 101 may cause the display unit 106 to display a connection processing progress screen 406, illustrated in FIG. 4, during the connection operations. After the connection operations are complete, the control unit 101 causes the display unit 106 to display a connection complete screen 407, illustrated in FIG. 4, and then ends the process.

In the present embodiment, in an electronic device capable of using a plurality of communication functions and communication methods, history information is stored for settings pertaining to the communication methods and settings pertaining to the communication functions. Then, if settings corresponding to a communication method or a communication function selected by the user are stored in the history information, those settings are provided in a selectable manner. Accordingly, if an external device that has been communicated with in the past is to be communicated with again, the user can carry out the communication easily by reusing the settings that were used in the past.

Second Embodiment

A second embodiment of the present invention will be described next. The present embodiment can also be carried out using the digital camera 100 described in the first embodiment, and thus descriptions of the configuration of the digital camera 100 will be skipped. The present embodiment differs from the first embodiment in that the connected device information 210 is displayed first in accordance with the state of the communication method of the digital camera 100.

Figure 5:
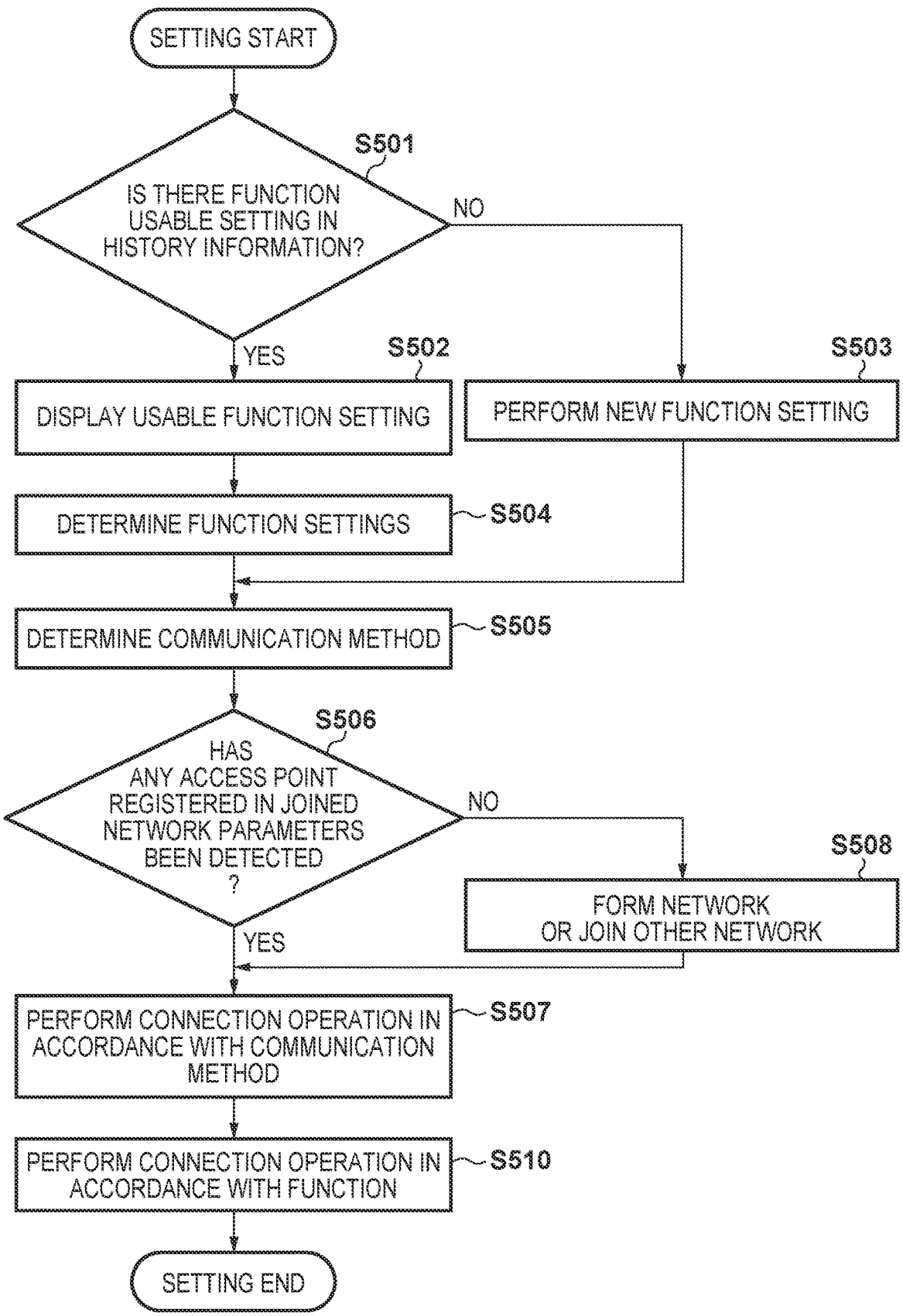
FIG. 5 is a flowchart pertaining to operations carried out by a digital camera according to a second embodiment.

Operations through which the digital camera 100 according to the present embodiment makes communication settings with an external device using the history information will be described with reference to the flowchart in FIG. 5. In FIG. 5, steps in which the same operations as in the first embodiment are carried out have been given the same reference signs as those in FIG. 3. The processing illustrated in FIG. 5 is started in response to the control unit 101 detecting that the user has called a communication settings screen by operating a menu or the like through the operation unit 105. Note that the operations of the digital camera 100, including the processes described hereinafter, are realized by the control unit 101 of the digital camera 100 loading programs, which are stored in the non-volatile memory 103, into the work memory 104 and executing the programs so as to control the various units in the digital camera 100. The present embodiment assumes that the digital camera 100 stores the history information illustrated in FIG. 2 in the non-volatile memory 103, and the control unit 101 uses the history information read out to the work memory 104, in the same manner as in the first embodiment. Additionally, it is assumed that the wireless adapter 110 is attached to the connection unit 108. FIG. 7C is an example of combinations of communication methods and communication functions according to the present embodiment, and corresponds to FIG. 7A, described in the first embodiment, but with the wired LAN removed. In the present embodiment too, it is assumed that the communication unit 109 supports only communication in the 2.4 GHz band, and that the wireless adapter 110 attached to the connection unit 108 supports communication in both the 2.4 GHz and 5 GHz bands.

In S501, the control unit 101 determines whether or not there is usable information (information that can be appropriately set) on the basis of the current available communication method (here, the connection unit 108 and the communication unit 109) and the connected device information 210 in the history information. The control unit 101 moves the process to S502 if it is determined that there is information that can be used, and to S503 if it is determined that there is not information that can be used.

In S502, the control unit 101 extracts, from the connected device information 210, the information determined in S501 to be usable. The control unit 101 then displays identification information (a registration name, here) corresponding to the extracted information in a selectable manner in the display unit 106 through a communication settings selection screen 601, illustrated in FIG. 6, and stands by for the user to make a selection.

Here, the communication unit 109 (built-in Wi-Fi) and the wireless adapter 110 connected to the connection unit 108 (external Wi-Fi) are available. Accordingly, based on the combinations illustrated in FIG. 7C, the control unit 101 determines that the connected device information corresponding to all of FTP (server), PC, and smartphone can be used. Accordingly, it is determined that the connected device information 211 to 215 can be used. Note that if the wireless adapter 110 is not connected to the connection unit 108, the control unit 101 determines that the connected device information corresponding to PC and smartphone can be used. Accordingly, it is determined that the connected device information 211, 212, 213, and 215 can be used.

Figure 6:
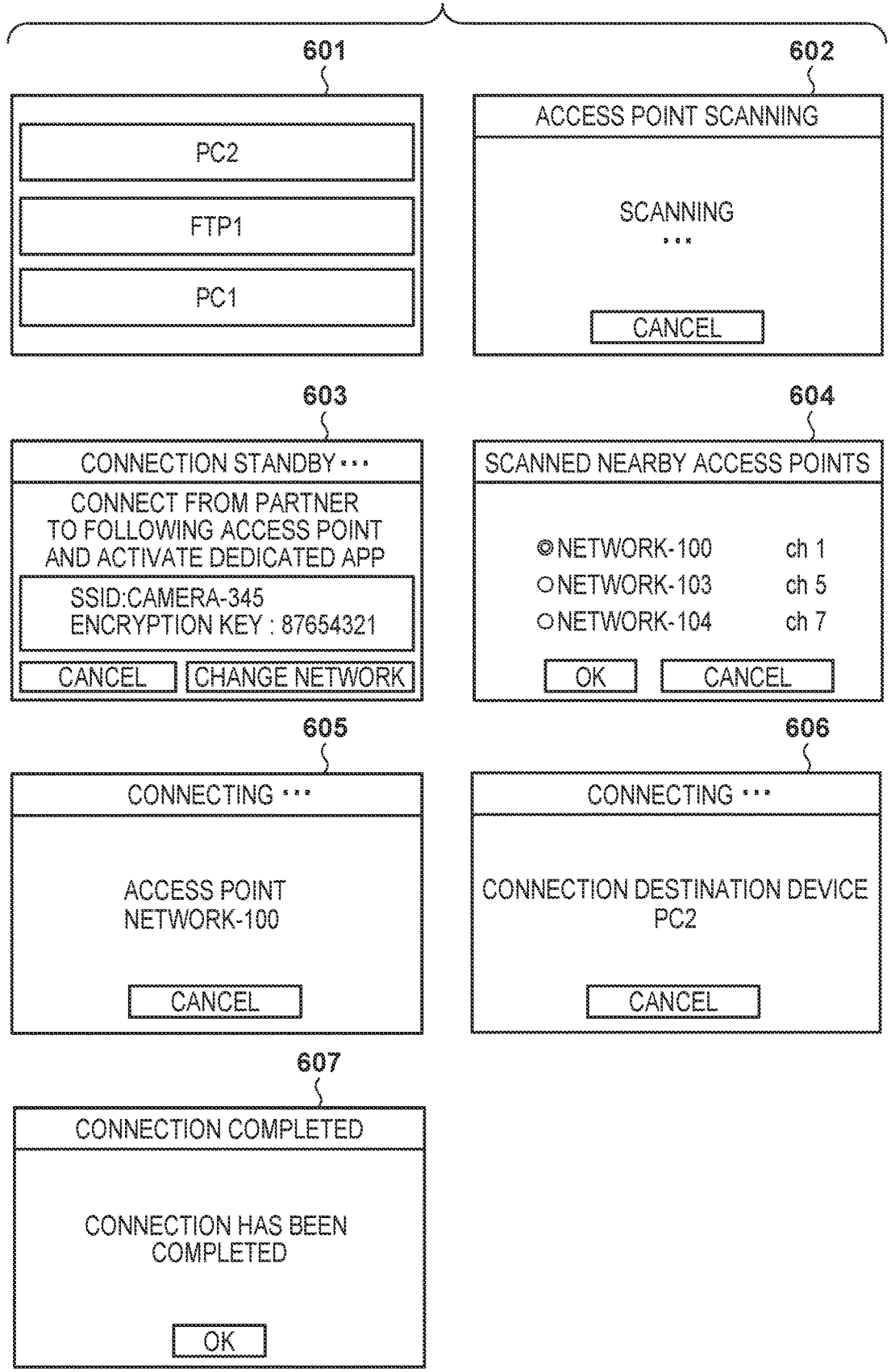
FIG. 6 is a diagram illustrating an example of a screen display in the digital camera according to the second embodiment.

The communication settings selection screen 601 illustrated in FIG. 6 is assumed to provide, to the user, the three pieces of information, among the connected device information determined to be usable, that are highest in the "connected order" (that is, for which the least amount of time has passed following the end of the most recent communication). In the communication settings selection screen 601, the connected device information 215, 214, and 213 are displayed, from the highest piece of information in the connected order. Here, it is assumed that of the connected device information, the registration name is displayed. However, in another embodiment, all of the connected device information determined to be usable may be displayed. If a number of pieces of the connected device information exceeding a predetermined maximum number that can be displayed in a single screen are determined to be usable, all of the connected device information determined to be usable may be displayed by configuring the screen to be capable of advancing through pages or of being scrolled.

Upon accepting an operation for selecting a registration name in the communication settings selection screen 601 in S502, the control unit 101 moves the process to S504. Here, it is assumed that the operation of a button corresponding to "PC2" has been detected in the communication settings selection screen 601. In S504, the control unit 101 determines that the function settings corresponding to the selected registration name are to be used, and moves the process to S505.

On the other hand, if in S501 it is determined that there is no usable information in the history information, the control unit 101 carries out a new function setting process in S503. For example, the control unit 101 can display a function settings screen, through which items from "device type" to "file overwrite" in the connected device information 210 can be input, in the display unit 106, and can allow the user to make inputs. Once the function settings are complete, the control unit 101 then moves the process to S505.

In S505, the control unit 101 determines the communication method in accordance with the function settings determined in S504 (or input in S505), and moves the process to S506. The communication method may be determined automatically by the control unit 101, or the user may be allowed to select the communication method. If the communication method is determined automatically, the control unit 101 can determine the communication method in accordance with a predetermined rule. For example, if the wireless adapter 110 is connected, the control unit 101 may determine the communication method so as to preferentially use the wireless adapter 110. However, if function settings in which the wireless adapter 110 cannot be used have been selected in S504, built-in Wi-Fi may be determined as the communication method. Here, it is assumed that built-in Wi-Fi (the communication unit 109) has been determined as the communication method.

In S506, the control unit 101 refers to the history information, and determines whether or not joined network parameters 220 includes parameters corresponding to the communication method determined in S505. If it is determined that joined network parameters 220 includes parameters corresponding to the determined communication method, the control unit 101 scans access points using the communication method determined in S505. While scanning the access points, the control unit 101 may display a scanning progress screen 602, illustrated in FIG. 6, in the display unit 106.

The control unit 101 then determines whether or not an access point registered in the joined network parameters 220 has been scanned, on the basis of the scanning result and the joined network parameters. If it is determined that an access point registered in the joined network parameters 220 has been scanned, the control unit 101 moves the process to S507.

On the other hand, if it is determined that there are no joined network parameters 220 corresponding to the selected communication method, that an access point registered in the joined network parameters 220 has not been scanned, or the like, the control unit 101 moves the process to S508.

If, in S507, an access point registered in the joined network parameters 220 has been scanned, the control unit 101 executes operations for connecting to a network formed by the scanned access point, and establishes a connection. The communication method determined in S505 and the joined network parameters stored in the history information are used in the connection operations. Note that if a plurality of access points registered in the joined network parameters 220 have been scanned, the control unit 101 preferentially executes the connection operations starting with the access point having the highest number for the "joined order", for example. The control unit 101 may cause the display unit 106 to display a connection progress screen 605, illustrated in FIG. 6, during the connection operations. The connection progress screen 605 in FIG. 6 indicates an example of a connection being made automatically with "NETWORK-100". When the automatic connection using the history information is complete, the control unit 101 moves the process to S510.

On the other hand, in S508, the control unit 101 refers to the function settings determined in S504 (here, the connected device information 215 corresponding to "PC2"), and determines whether or not there is a number in "network formation parameter number". If it is determined that there is a number in "network formation parameter number", the control unit 101 forms a network using the parameters for that number in the network formation parameters 230. In this example, a network formation parameter number of "2" is stored in the connected device information 215, and thus the control unit 101 forms a network using network formation parameters 232. If there is no number stored for "network formation parameter number" in the selected function settings, the control unit 101 generates new parameters and forms a network. Once the network is formed, the control unit 101 displays a connection standby screen 603, illustrated in FIG. 6, in the display unit 106. Note that if both the communication unit 109 and the wireless adapter 110 are available when forming the network, the network may be formed using either of those elements. For example, the control unit 101 can use the communication unit 109 preferentially.

The connection standby screen 603 includes a message containing parameters required for connecting to the formed network, a button for instructing the network formation to be canceled, and a button for instructing a network change. The control unit 101 stands by to receive a request to connect to the formed network using parameters displayed in the connection standby screen 603 during a period where no button operations are detected in the connection standby screen 603, and then moves the process to S507 when the reception of the request is detected. If the operation of the "change network" button has been detected, the control unit 101 terminates the formation of the network and scans nearby access points. The control unit 101 then displays a screen, which shows a list of the scanned access points that can be selected (e.g., a scanning result screen 604 illustrated in FIG. 6), in the display unit 106.

When the operation of an OK button in the scanning result screen 604 is detected, the control unit 101 carries out operations for connecting to the network selected in the scanning result screen 604. If the selected network is a network stored in the joined network parameters 220, the control unit 101 carries out the connection operations using the joined network parameters 220. On the other hand, if the selected network is a network not stored in the joined network parameters 220, the control unit 101 displays an input screen for parameters required to join the network in the display unit 106, and prompts the user to input the parameters. The control unit 101 then moves the process to S507.

For example, in the example of the scanning result screen 604 illustrated in FIG. 6, out of "NETWORK-100", "NETWORK-103", and "NETWORK-104", the joined network parameters 220 can be used when "NETWORK-100" has been selected. On the other hand, it is necessary for the user to input the parameters if "NETWORK-103" or "NETWORK-104" is selected.

In S507, the control unit 101 executes network connection operations with an external device that has transmitted a request to connect to the network formed in S508. Alternatively, operations for connecting to a network formed by a nearby access point selected by the user are executed. Once the connection operations are complete, the control unit 101 moves the process to S510.

In S510, the control unit 101 carries out operations for connecting with the partner device (connection operations for communication between applications) through the connection unit 108 or the communication unit 109, on the basis of the function settings set in S504. The control unit 101 may cause the display unit 106 to display a connection processing progress screen 606, illustrated in FIG. 6, during the connection operations. After the connection operations are complete, the control unit 101 causes the display unit 106 to display a connection complete screen 607, illustrated in FIG. 6, and then ends the process.

As described thus far, the present embodiment can realize the same effects as those of the first embodiment.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-20334, filed on Feb. 7, 2018, which is hereby incorporated by reference herein in its entirety.

What is claimed is:

1. An electronic device capable of using a plurality of wireless communication interfaces, the electronic device communicating wirelessly with an external device using one of the plurality of wireless communication interfaces, the electronic device comprising:
  a storage device that stores one or more sets of settings used in past wireless communication with one or more external devices, the settings being stored separately as information pertaining to a network used in the wireless communication and information pertaining to the one or more external devices; and
  a controller that accepts a selection of a combination of a type of an external device with which wireless communication to be performed and one of the plurality of wireless communication interfaces to be used for the wireless communication, and extracts one or more sets of settings that can be used from the one or more sets of settings stored in the storage device, in accordance with the selection.

2. The electronic device according to claim 1, further comprising:
  a display device,
  wherein the controller controls the display device so as to display the extracted one or more sets of settings to be selectable by a user.

3. The electronic device according to claim 2, wherein the controller:
  controls the display device so as to display, in a selectable manner, network identification information of networks corresponding to the one or more sets of settings that can be used, from among the information pertaining to networks, in accordance with the combination;
  controls the display device so as to display, in a selectable manner, device identification information of external devices that have been wirelessly communicated with over a network corresponding to network identification information that has been selected from among the displayed network identification information; and
  determines to communicate wirelessly with one of the external devices corresponding to device identification information selected from the displayed device identification information, using information pertaining to the one of the external devices.

4. The electronic device according to claim 2, wherein the controller:
  controls the display device so as to display, in a selectable manner, device identification information of external devices that have communicated wirelessly using one or more available wireless communication interfaces, among the plurality of wireless communication interfaces; and
  determines, in accordance with an external device corresponding to selected device identification information, one of the one or more available wireless communication interfaces to be used in the wireless communication with the external device, and
  in the case where settings for joining a network that is scanned using the determined wireless communication interface are stored as the information pertaining to networks, the electronic device establishes a connection with the network using the stored information.

5. The electronic device according to claim 2, wherein the controller:
  controls the display device so as to display, in a selectable manner, device identification information of external devices that have communicated wirelessly using one or more available wireless communication interfaces, among the plurality of wireless communication interfaces; and
  determines, in accordance with an external device corresponding to device identification information selected from the displayed device identified information, one of the one or more available wireless communication interfaces to be used in the wireless communication with the external device, and
  in the case where settings for forming a network are associated with the information pertaining to the external device, the electronic device forms a network on the basis of the information pertaining to the external device.

6. The electronic device according to claim 5, wherein in the case where settings for joining a network that is scanned using the determined wireless communication interface are not stored as the settings pertaining to networks, and settings for forming a network are associated with the information pertaining to the external device, the electronic device forms a network on the basis of the information pertaining to the external device.

7. The electronic device according to claim 1, wherein the information pertaining to a network includes settings for the electronic device to form a network, and settings for the electronic device to join a network formed by another device.

8. The electronic device according to claim 1, wherein the plurality of wireless communication interfaces include a first wireless communication interface that is built-in the electronic device and a second wireless communication interface that can be attached to and removed from the electronic device.

9. The electronic device according to claim 8, wherein both the first wireless communication interface and the second wireless communication interface are compliant with a wireless LAN standard.

10. A method of controlling an electronic device capable of using a plurality of wireless communication interfaces, the electronic device communicating wirelessly with an external device using one of the plurality of wireless communication interfaces,
  wherein the electronic device includes a storage device that stores one or more sets of settings used in past wireless communication with one or more external devices, the settings being stored separately as information pertaining to a network used in the wireless communication and information pertaining to the one or more external devices; and
  the method comprising:
  accepting a selection of a combination of a type of an external device with which wireless communication to be performed and one of the plurality of wireless communication interfaces to be used for the wireless communication;
  extracting one or more sets of settings that can be used from the one or more sets of settings stored in the storage means, in accordance with the selection.

11. A non-transitory computer-readable medium storing a program for causing a computer of an electronic device capable of using a plurality of wireless communication interfaces, wherein the electronic device communicates wirelessly with an external device using one of the plurality of wireless communication interfaces and comprises a storage device that stores one or more sets of settings used in past wireless communication with one or more external device, the settings being stored separately as information pertaining to a network used in the wireless communication and information pertaining to the one or more external devices, and wherein the program causes, when executed by the computer, the computer to function as a control unit that accepts a selection of a combination of a type of an external device with which wireless communication to be performed and one of the plurality of wireless communication interfaces to be used for the wireless communication, and extracts one or more sets of settings that can be used from the one or more sets of settings stored in the storage device, in accordance with the selection.

* * * * *